United States Patent
Achelpohl

[11] Patent Number: 5,580,582
[45] Date of Patent: Dec. 3, 1996

[54] BLOWING HEAD FOR THE MANUFACTURE OF TUBULAR FILM FROM THERMOPLASTIC SYNTHETIC RESIN

[75] Inventor: Fritz Achelpohl, Lengerich, Germany

[73] Assignee: Windmöller & Hölscher, Lengerich, Germany

[21] Appl. No.: 389,726

[22] Filed: Feb. 15, 1995

Related U.S. Application Data

[63] Continuation of Ser. No. 989,324, Dec. 11, 1992, abandoned.

[30] Foreign Application Priority Data

Dec. 12, 1991 [DE] Germany ............................ 41 40 990.6
Mar. 9, 1992 [DE] Germany ............................ 42 07 439.8

[51] Int. Cl.⁶ .................................................. B29C 47/86
[52] U.S. Cl. ..................... 425/72.1; 264/209.3; 264/569; 425/326.1
[58] Field of Search ..................................... 425/72.1, 141, 425/326.1, 387.1; 264/209.3, 209.7, 566, 569

[56] References Cited

U.S. PATENT DOCUMENTS

| | | | |
|---|---|---|---|
| 4,209,475 | 6/1980 | Herrington et al. | 425/72.1 X |
| 4,330,501 | 5/1982 | Jones et al. | 425/72.1 X |
| 4,373,273 | 2/1983 | Church | 425/72.1 X |
| 4,443,400 | 4/1984 | Herrington | 264/569 X |
| 4,606,879 | 8/1986 | Cerisano | 264/566 X |
| 5,281,375 | 1/1994 | Konermann | 264/569 X |
| 5,288,219 | 2/1994 | Smith | 425/72.1 |

FOREIGN PATENT DOCUMENTS

| | | | |
|---|---|---|---|
| 1960962 | 8/1971 | Germany | 425/72.1 |
| 2658518 | 4/1983 | Germany . | |
| 3743720 | 12/1990 | Germany | 425/72.1 |
| 304140 | 5/1971 | U.S.S.R. | 425/72.1 |
| 290663 | 12/1985 | U.S.S.R. | 425/72.1 |

*Primary Examiner*—Richard L. Chiesa
*Attorney, Agent, or Firm*—Keck, Mahin & Cate

[57] ABSTRACT

A blowing head for the manufacture of tubular film from thermoplastic synthetic resin includes ducts for the supply and removal of internal cooling air, at least one supply duct for fused synthetic resin which opens into an annular outlet nozzle, an external cooling ring encircling the extruded synthetic resin film and a supply of air at different temperatures to sectors of the external cooling ring which are distributed over the periphery of the extruded tubular film for differentially heating or cooling the film.

2 Claims, 4 Drawing Sheets

BLOWING HEAD FOR THE MANUFACTURE OF TUBULAR FILM FROM THERMOPLASTIC SYNTHETIC RESIN

This is a continuation application of Ser. No. 07/989,324, filed Dec. 11, 1992, now abandoned.

FIELD ON THE INVENTION

The present invention relates to a blowing head for the manufacture of tubular film from thermoplastic synthetic resin comprising ducts for the supply and removal of internal cooling air, at least one supply duct for fused synthetic resin, which opens into an annular outlet nozzle, an external cooling ring encircling the extruded synthetic resin film and means for the supply of air at different temperatures to sections, which are distributed over the periphery, of the extruded tubular film.

BACKGROUND OF THE INVENTION

Blowing heads of this type have been proposed in different designs, the internal cooling air supplied and removed in the axial direction through the film blowing head serves for the cooling of the extruded tubular film and for the inflation of the tubular film to form a tubular film bladder stretching out the fused synthetic resin tubular film. The external cooling ring has an annular nozzle gap directed towards the extruded tubular film gap, through which the cooling air is caused to impinge on the film so that the film is rapidly cooled down with the lowest possible so-called frost line in order to increase the output rate.

In order to be able to control the thickness of the tubular film, inflated to constitute a tubular film bladder, around its periphery, it is possible, in accordance with the prior art, to heat and/or to cool the tubular extruded fused synthetic resin differentially in sections of the periphery thereof in order to influence thickness gradient. In this case the effect is profited from that on inflating the tubular synthetic resin film to constitute a film bladder the hotter parts and the cooler parts are more and, respectively, less extended.

In the case of a film blowing head in accordance with the German patent 2,658,518 of the type initially mentioned for influencing the extruded tubular film to be at different peripheral temperatures a plurality of correcting air nozzles is arranged over the external air blowing ring in a circle encircling the tubular film, adjustment valves, which are suitably controlled, being associated with the individual correcting air nozzles. However this known film blowing head is comparatively involved in design owing to the necessity of having a plurality of radial air nozzles which are pointed towards the extruded tubular film to blow air at different temperatures onto it.

SUMMARY OF THE INVENTION

Accordingly one object of the invention is to provide a compactly designed film blowing head of the type initially mentioned.

In accordance with the invention this object is to be attained in a film blowing head of the type initially mentioned, since the external cooling ring is subdivided into sectors, in which the air directed onto the extruded tubular film is able to be differentially cooled and/or heated. The film blowing head in accordance with the invention consequently has a compact design, because the elements for differential heating of the air blown onto the extruded tubular film are directly integrated in the external cooling ring.

In accordance with an advantageous development of the invention there is the provision of radial lamellar guide bodies arranged in the external cooling ring between the outer part of the annular space and the inner nozzle-like outlet part, such bodies being able to be cooled and/or heated independently of each other. In the case of this design of the film blowing head in accordance with the invention the cooling air supplied to the external cooling ring is differently cooled as necessary within the external cooling ring without additional air nozzles having to be provided through which differentially heated air may be blown, if desired at different rates.

It is convenient if the guide bodies extend through the annular space in the vertical direction so that the same is more or less divided up by sector-like blowing air cells.

The guide bodies may be designed so as to be streamlined in horizontal section.

The guide bodies may be arranged to be heated or, however, cooled by different means. It is convenient for the guide bodies to be furnished with electrical heating elements.

A further advantageous feature of the invention is such that electrical heating rod elements are arranged in the external cooling ring extending radially inwards. The electrical heating rods may be secured on the outer peripheral wall surface of the cooling ring.

In accordance with a further advantageous development of the invention, additional air nozzles are arranged in the cooling ring, which may be utilized for the injection of air which is heated or cooled to be hotter or cooler than the blowing air supplied into the cooling ring. The direction of blowing of these additional air nozzles is conveniently radial with respect to the extruded synthetic resin tubular film.

A further advantageous feature of the invention is such that the air nozzles are in the form of a ring of vortex nozzles directed radially on the extruded synthetic resin tubular film. Such vortex nozzles are supplied by the Dutch company Simco and they have central annular plenum into which compressed air is supplied radially or respectively tangentially through a duct. On the one side cooled air and on the other side heated air then emerges from axial nozzles arranged perpendicularly to the direction of air injection. If for instance compressed air is injected into the central plenum at a temperature of 21° C., then on the one side cold air at minus 46° C. will emerge and on the other side heated air at a temperature of 100° C. will emerge.

It is convenient furthermore if the vortex nozzles are so arranged in the interior of the external cooling ring so that the ducts supplying the compressed air extend through the upper walls of the external cooling ring and respectively first ones of the outlet nozzles are directed onto the synthetic resin tubular film, while the respective other outlet nozzles open towards the outside.

Respective ones of the outlet nozzles of the vortex series may furthermore be arranged to extend through the outer peripheral wall surface of the outer cooling ring.

In accordance with an advantageous development of the invention the vortex nozzles are directed onto the synthetic resin tubular film so that they alternately direct their cold and hot air onto the film and it is possible to produce different temperature gradients.

The compact manner of construction provided in accordance with the invention furthermore renders it possible to arrange the elements heating or cooling the blown air in the internal cooling ring.

In accordance with a further working embodiment the external cooling ring is provided with nozzles directed onto the extruded synthetic resin tubular film or with a slot-like nozzle directed onto the same and furthermore the ring constituting the external lip of the outlet nozzle is provided with a plurality of adjacently arranged holes or ducts extending approximately parallel to the emerging synthetic resin tubular film, from which holes or ducts additional air currents may be blown and the additional air currents from the individual holes are able to be differentially heated and/or cooled. By means of the holes or ducts extending through the external nozzle ring it is accordingly possible to modify the temperature gradient of the external nozzle lip in accordance with the supply to these individual ducts with air heated or, respectively, cooled to different degrees with the result that a more intensive action may be produced on the emerging fused synthetic resin. The additional air currents may be blown softly. In accordance with requirements it is possible for the flow velocity to be uniformly increased or reduced or, however, for the flow velocity of individual holes or ducts to be differently selected.

BRIEF DESCRIPTION OF THE DRAWINGS

Working embodiments of the invention will now be described in the following with reference to the accompanying drawings.

DESCRIPTION OF THE PREFERRED EMBODIMENTS

Figure 1:
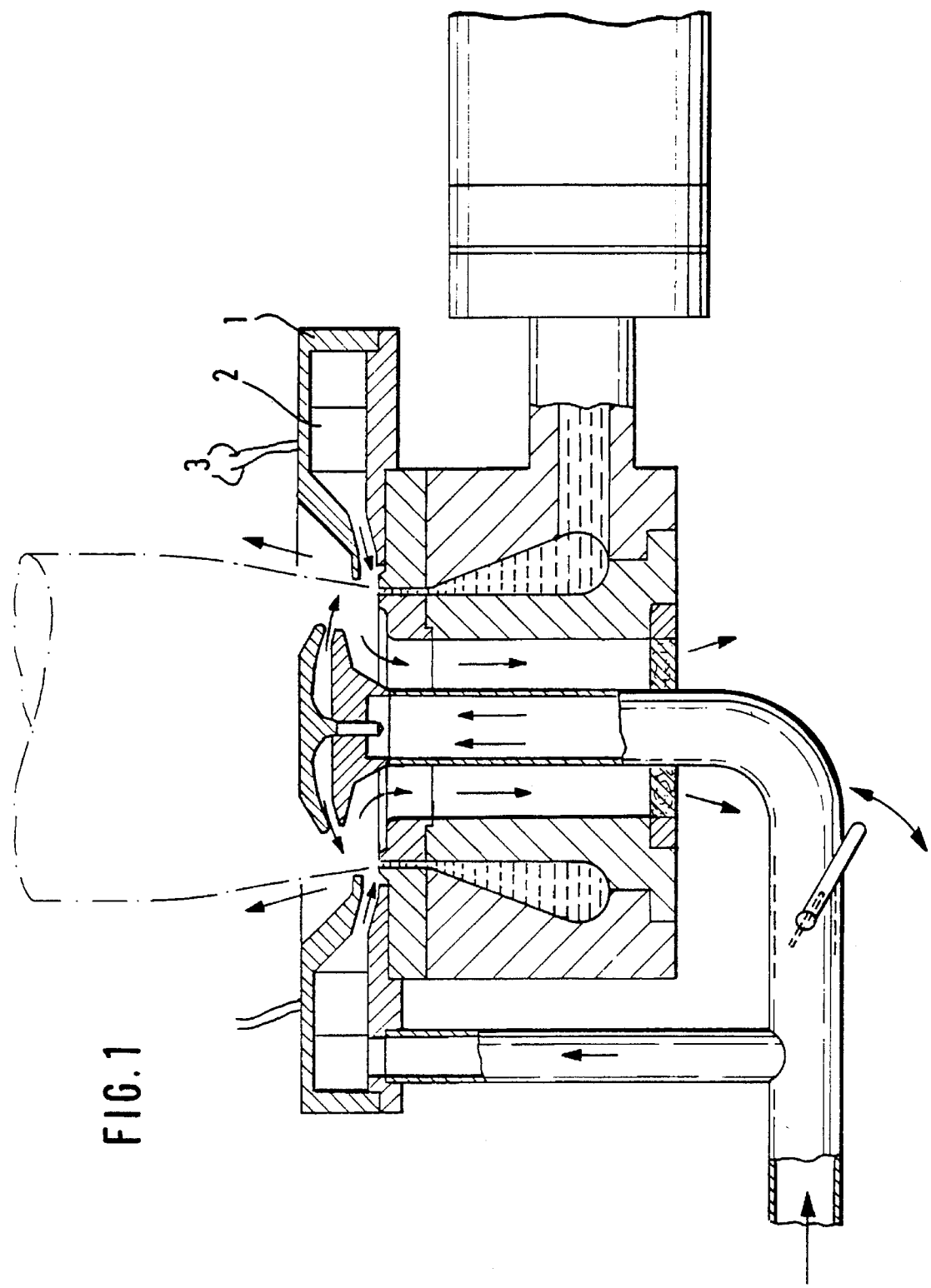
FIG. 1 is a vertical cross section taken through a first working embodiment of a film blowing head.

The film blowing head depicted in FIG. 1 is supplied with fused synthetic resin from a diagrammatically indicated extruder through a connection union. The fused synthetic resin is then supplied for distribution to an annular manifold duct, which opens into the annular outlet nozzle. The tubular film as shown in broken lines emerges from the annular nozzle gap, which is defined by two annular orifice rings. On the external nozzle ring the cooling ring 1 is arranged, which directs the cooling air through the preferably downwardly inclined annular gap towards the extruded tubular film directly above the orifice rings.

The cooling air, which is supplied, all comes from a blower, not illustrated, for internal and external cooling is supplied through a connection tube to the external cooling ring and, respectively, is supplied through a tube with a throttle flap for control of the ratio of the impinging air currents, to the internal cooling ring, the outlet gap, like that of the external cooling ring, being preferably inclined downwards or arranged for simply blowing radially outwards so that the tightly parallelized air jet impinges on the internal side of the tubular film generally at the same level as the external air jet. The basic construction or design of the film blowing head shown in FIG. 1 may be in accordance with the German patent publication 1,960,962 A, to which reference should be had in order to simplify the description.

In the case of the film blowing head in accordance with the invention lamellae 2 are arranged in the external cooling ring 1 with equal spacing from each other around the periphery in a circle, such lamellae being able to be heated via electrical connections 3 independently of each other.

Figure 2:
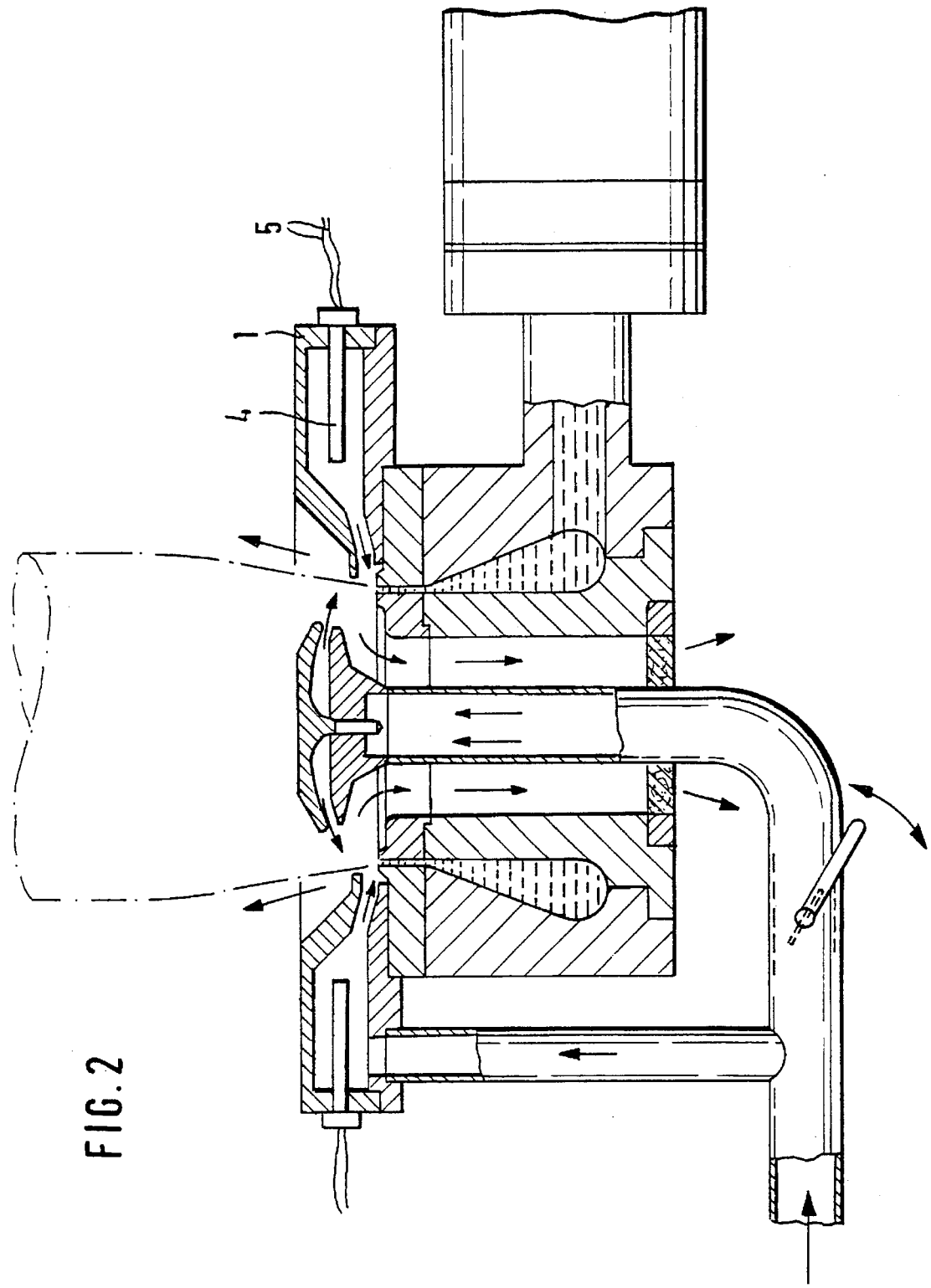
FIG. 2 is a vertical cross section taken through a second working embodiment of a film blowing head.

In the case of the working embodiment in accordance with FIG. 2 instead of the lamellae electrical heating rods 4 are arranged around the periphery evenly in the external cooling ring, and they extend radially inwards. The heating rods 4 are, as shown in FIG. 2, positioned in the annular outer wall of the external cooling ring 1. The heating rods 4 are provided with heating cartridge elements, which, like the lamellae as well of the working embodiment described in the above, may be operated independently of each other via electrical connection leads 5.

Furthermore in lieu of the heating cartridges 4 it is possible for air nozzles to be arranged in the wall so as to have a radial direction of blowing and via which, in accordance with requirements, hot or cold air may be injected in different zones.

Figure 3:
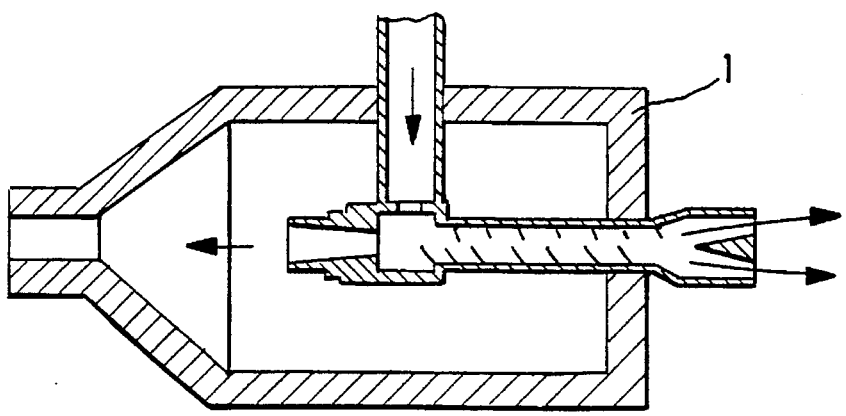
FIG. 3 is a vertical cross section taken through an external cooling ring with a vortex cooling nozzle therein.
Figure 4:
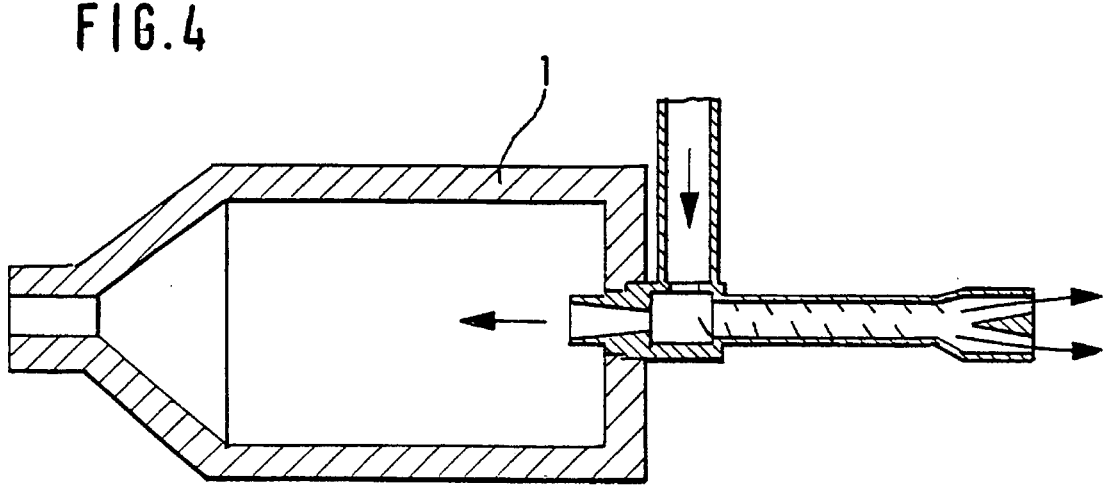
FIG. 4 is a vertical cross section taken through a cooling ring in which the vortex cooling nozzle is incorporated in the external wall surface.

Preferred designs of such air nozzles are shown in FIGS. 3 and 4. In the case of such air nozzles it is a question of so-called vortex nozzles, into which for instance compressed air is fed in at 21°, the air current being so divided up in the central plenum that hot air at 100° flows from the outwardly directed part while from the inwardly directed nozzle cold air at −46° emerges.

In the illustrated working embodiment of the invention of FIGS. 3 and 4 the vortex nozzles are so installed that the nozzles for the cold air are directed radially outwards. In the case of a further possible working embodiment it is possible for them to blow cold air in one case and hot air in the other case in a radially inward direction.

Figure 5:
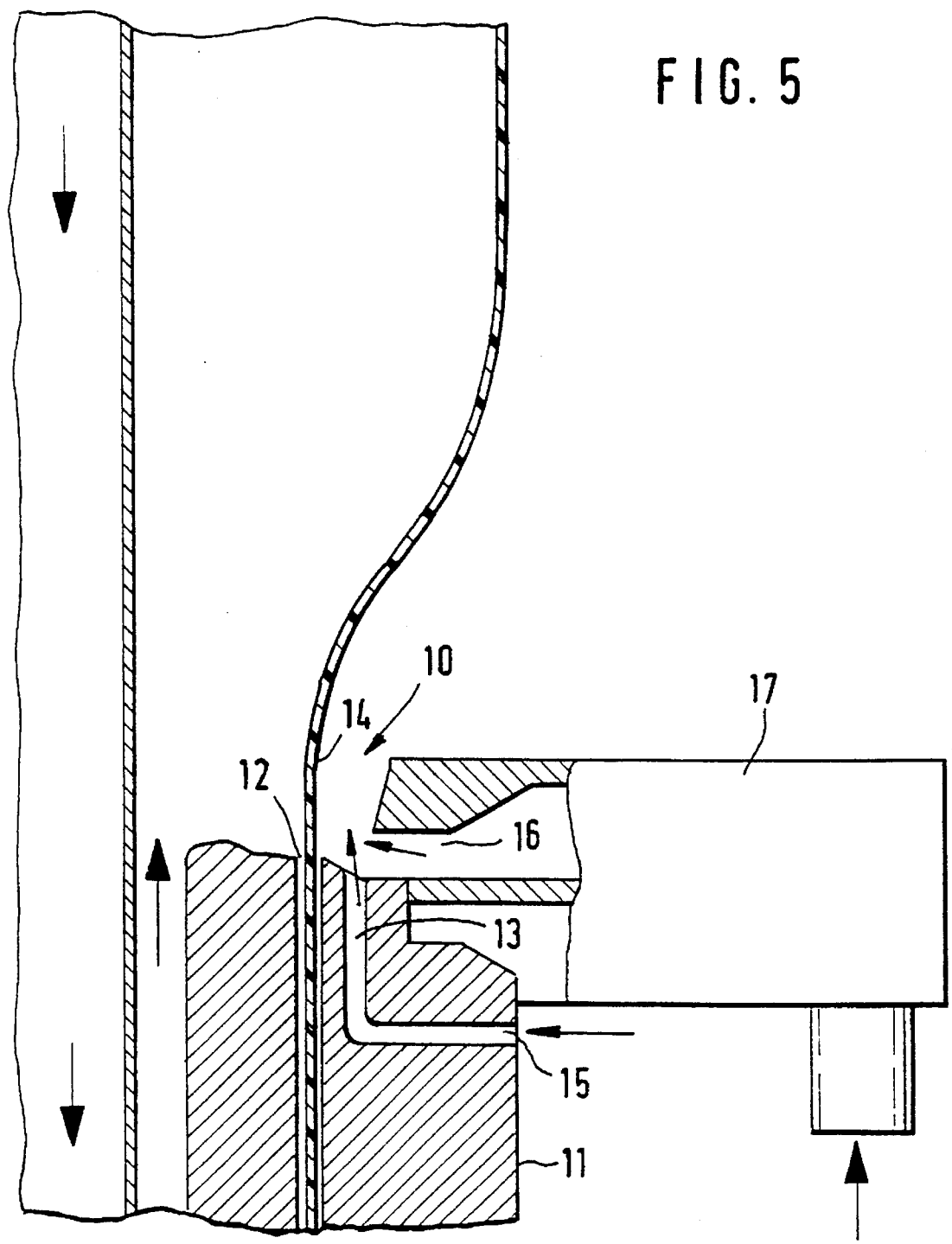
FIG. 5 is a cross section taken through the annular outlet nozzle with the external cooling ring therein.

FIG. 5 shows a further possible working embodiment of a film blowing head, in the case of which the external ring 11, which defines the annular nozzle gap 12 of the annular outlet nozzle 10 and which constitutes an external annular nozzle lip, is provided with holes 13, which extend along a certain distance generally parallel to the emerging fused synthetic resin tube 14 and then open into a hole 15, which leads radially outwards. The holes 13 are arranged with generally equal spacing on a circular line, coaxial to the outlet gap 12, of the external ring 11. Through the connection holes 13 it is possible to supply heated or cooled air in a controlled manner, which air then impinges on the cooling air current as shown in the figure, such cooling air current emerging from the nozzle gap 16 of the external cooling ring 17.

What is claimed is:

1. A blowing head for the manufacture of tubular film from thermoplastic synthetic resin comprising:
   ducts for supplying and removing internal cooling air,
   at least one duct for supplying fused synthetic resin, wherein said duct opens into an annular outlet nozzle defined by an internal ring and an external ring between which the blown tubular film emerges,
   an external cooling ring encircling the extruded synthetic resin film,
   and means for supplying air heated to different temperatures to sections, which are distributed over the periphery of the extruded tubular film, wherein:
   the external cooling ring is subdivided into sectors, wherein air directed onto the extruded tubular film is differentially cooled and/or heated, wherein the external cooling ring (17) comprises nozzles for air directed onto the extruded synthetic resin tubular film (14) or a nozzle gap (16) directed onto the tubular film, and wherein the external ring (11) of the annular outlet nozzle (10) is provided with a plurality of adjacently arranged elongated holes (13), each hole (13) extending directly adjacent to and with its length approximately parallel to the emerging synthetic resin tubular film and then opening into a hole (15) which leads radially outward, from which holes (13,15) additional air currents are blown in a direction approximately parallel to the emerging synthetic resin tubular film, and the elongated holes (13) extend over a sufficient length that the air currents blown through the holes (13,15) in the external ring (11) influence the temperature of the tubular film (14) both along the length of hole (13) before extrusion and also, in combination with air from the external cooling ring (17), after extrusion of the tubular film (14), and wherein air from the elongated holes (13) and air from the nozzles or nozzle gap (16) impinge upon one another at the same location at which air emerges from holes (13) and nozzles or nozzle gap (16), respectively.

2. A blowing head for the manufacture of tubular film from thermoplastic synthetic resin comprising:

ducts for supplying and removing internal cooling air, at least one duct for supplying fused synthetic resin, wherein said duct opens into an annular outlet nozzle defined by an internal ring and an external ring between which the blown tubular film emerges, an external cooling ring encircling the extruded synthetic resin film, and means for supplying air heated to different temperatures to sections, which are distributed over the periphery of the extruded tubular film, wherein:

the external cooling ring is subdivided into sectors, wherein air directed onto the extruded tubular film is differentially cooled and/or heated, wherein the external cooling ring (17) comprises nozzles directed onto the extruded synthetic resin tubular film (14) or a nozzle gap (16) directed onto the tubular film, and wherein the external ring (11) of the annular outlet nozzle (10) is provided with a plurality of adjacently arranged elongated holes (13), each hole (13) extending through the external ring (11) directly adjacent to and with its length approximately parallel to the emerging synthetic resin tubular film and then opening into a hole (15) which leads radially outward, from which holes (13,15) additional air currents may be blown, wherein said additional air currents for blowing air from the holes (13,15) are differently heated and/or cooled and extend in the external ring (11) approximately parallel to the emerging synthetic resin tubular film directly adjacent thereto, and the elongated holes (13) extend over a sufficient length that the air currents blown through the holes (13, 15) in the external ring (11) influence the temperature of the tubular film (14) both along the length of hole (13) before extrusion and also, in combination with air from the external cooling ring (17), after extrusion of the tubular film (14), and wherein air from the elongated holes (13) and air from the nozzles or nozzle gap (16) impinge upon one another the same location at which air emerges from holes (13) and nozzles or nozzle gap (16), respectively.

* * * * *